United States Patent
Tirloni (10) Patent No.: US 7,027,698 B2
(45) Date of Patent: Apr. 11, 2006

(54) OPTICAL FIBER FOR WDM TRANSMISSION

(75) Inventor: Bartolomeo Italo Tirloni, Bergamo (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 149 days.

(21) Appl. No.: 10/220,474

(22) PCT Filed: Mar. 1, 2001

(86) PCT No.: PCT/EP01/02313

§ 371 (c)(1),
(2), (4) Date: Feb. 25, 2003

(87) PCT Pub. No.: WO01/65287

PCT Pub. Date: Sep. 7, 2001

(65) Prior Publication Data

US 2003/0180019 A1    Sep. 25, 2003

Related U.S. Application Data

(60) Provisional application No. 60/188,166, filed on Mar. 10, 2001.

(30) Foreign Application Priority Data

Mar. 3, 2000    (EP) .................................. 00104646

(51) Int. Cl.
*G02B 6/02* (2006.01)
(52) U.S. Cl. ...................... 385/123; 385/124; 385/126; 385/127
(58) Field of Classification Search ................ 385/123, 385/124, 126, 127
See application file for complete search history.

(56) References Cited

U.S. PATENT DOCUMENTS 4,406,518 A    9/1983    Matsumura et al.

(Continued)

FOREIGN PATENT DOCUMENTS

EP    0 464 812    1/1992

(Continued)

OTHER PUBLICATIONS

Luc B. Jeunhomme et al., "Equivalent Step-Index-Fiber Methods" *Single Mode Fiber Optics*, p. 32-39, section 1.3.2 (1990).

*Primary Examiner*—Michael G. Lee
*Assistant Examiner*—Kimberly D. Nguyen
(74) *Attorney, Agent, or Firm*—Finnegan, Henderson, Farabow, Garrett & Dunner, L.L.P.

(57) ABSTRACT

A half-dispersion-shifted single mode optical transmission fiber (HDSF) having a core and a cladding. The core has an inner core with a first refractive-index difference and a first glass layer surrounding the inner core and having a second refractive-index difference. The HDSF fiber has a peak refractive index difference of less than or equal to about 0.0140, a zero-dispersion wavelength greater than 1450 nm and lower than 1500 nm, a dispersion value of between about 6 and 11 ps/nm/km at an operating wavelength of about 1560 nm and an effective area of at least 60 $\mu m^2$. The cabled HDSF fiber has cutoff wavelength of less than about 1500 nm. An optical transmission line having a first span including at least one single-mode fiber having a negative dispersion at an operating wavelength and a second span coupling to the first span, the second span having at least one HDSF fiber, the positive dispersion of the second span compensating the negative dispersion of the first span such that the cumulative dispersion across the first and second spans is approximately zero.

18 Claims, 8 Drawing Sheets

U.S. PATENT DOCUMENTS

| | | |
|---|---|---|
| 4,852,968 A | 8/1989 | Reed |
| 4,969,710 A | 11/1990 | Tick et al. |
| 5,013,131 A * | 5/1991 | Fotheringham ............. 385/124 |
| 5,343,322 A | 8/1994 | Pirio et al. |
| 5,559,920 A | 9/1996 | Chraplyvy et al. |
| 5,587,830 A | 12/1996 | Chraplyvy et al. |
| 5,611,016 A | 3/1997 | Fangmann et al. |
| 5,675,429 A | 10/1997 | Henmi et al. |
| 5,719,696 A | 2/1998 | Chraplyvy et al. |
| 5,778,128 A | 7/1998 | Wildeman |
| 5,905,838 A * | 5/1999 | Judy et al. .................. 385/123 |
| 5,995,694 A | 11/1999 | Akasaka et al. |
| 6,577,800 B1 * | 6/2003 | Sarchi et al. ............... 385/123 |

FOREIGN PATENT DOCUMENTS

| | | |
|---|---|---|
| EP | 0 774 676 | 5/1997 |
| EP | 0 790 510 | 8/1997 |
| EP | 0 859 247 | 8/1998 |
| EP | 0 862 069 | 9/1998 |
| EP | 0 965 866 | 12/1999 |
| EP | 965866 A1 * | 12/1999 |
| GB | 2 268 018 | 12/1993 |
| WO | WO00/38356 | 6/2000 |

* cited by examiner

OPTICAL FIBER FOR WDM TRANSMISSION

CROSS REFERENCE TO RELATED APPLICATIONS

This application is a national phase application based on PCT/EP01/02313, filed Mar. 1, 2001, the content of which is incorporated herein by reference, and claims the priority of European patent application no. 00104646.5, filed Mar. 3, 2000, the content of which is incorporated herein by reference, and claims the benefit of U.S. Provisional Application No. 60/188,166, filed Mar. 10, 2000, the content of which is incorporated herein by reference.

BACKGROUND OF THE INVENTION

The present invention relates generally to an optical fiber for multi-wavelength transmission. Moreover, the present invention relates to an apparatus and method for reducing the total attenuation and non-linear effects associated with long distance optical transmission.

In today's worldwide communication systems, it is often necessary to extend a transmission line over a long distance, which may include a body of water, to provide a communication link between a transmitter and a receiver. The current trend in communication systems is to use optical fibers to make these transmission lines. Optical fibers are preferred because the fibers can transmit a large number of digital signals at a high data transmission rate.

To further improve the signal carrying capacity of the transmission line, optical fibers can be used with Wavelength Division Multiplexing (WDM) technology. This technology allows multiple optical signals to be sent through the same fiber at closely spaced wavelength channels. This greatly enhances the information carrying capacity of the overall transmission system.

Several problems are encountered when optical fibers are used to transmit signals over a significant distance. For example, the power of the optical signal decreases as the signal travels through each fiber. This power loss, also called attenuation, can be compensated for by including amplifiers along the transmission line to boost the power of the signal. The placement and number of amplifiers along the transmission line is partly determined by the attenuation of the optical fiber. Obviously, a signal sent through a fiber with a low attenuation needs fewer amplifiers than a signal sent over a fiber with a high attenuation.

Chromatic dispersion is another problem encountered when transmitting signals over optical fibers. Chromatic dispersion, hereafter referred to as "dispersion," arises from the optical fiber transmitting the different spectral components of an optical pulse at different speeds, which can lead to the spreading or broadening of an optical pulse as it travels down the transmission line. Each optical fiber has a dispersion value that varies as a function of the wavelength of the optical signal and arises from the material composition of the glass optical fiber and the waveguide characteristics. The dispersion within the optical fiber at a given wavelength can be positive, negative, or zero, depending on the transmission characteristics of the fiber. Despite the type of dispersion (positive or negative), excessive amounts can lead to detection errors at the receiver of the optical signal.

Transmitting signals at the zero-dispersion wavelength of a fiber will practically eliminate the dispersion problem, but can exacerbate other transmission problems, particularly non-linear effects when used with WDM systems. A particularly relevant non-linear effect in WDM systems is the phenomenon of Four Wave Mixing (FWM). FWM occurs when at least two signals verifying phase matching conditions are sent through the same fiber (as in WDM systems) and interact to generate new wavelengths. In the case of WDM systems having a large number (more than two) of equally spaced channels, these new wavelengths will eventually overlap with the signal wavelengths, thus degrading the Signal-to-Noise Ratio. It is known that WDM systems that have an operating wavelength different from the zero-dispersion wavelength of the transmission fiber (and therefore have a non-zero dispersion value at the operating wavelength) minimize FWM degradation. More precisely, FWM efficiency η, defined as the ratio of the FWM power to the per channel output power (assuming equal input power for all the channels) is approximately proportional to:

$$\eta \propto \left[\frac{n_2 \alpha}{A_{\mathit{eff}} D(\Delta\lambda)^2}\right]^2$$

where $\alpha$ is the fiber attenuation; $n_2$ is the non-linear refractive index; $A_{\mathit{eff}}$ is the fiber effective area; D is the dispersion; and $\Delta\lambda$ is the channel spacing. The above approximation is valid under the condition $\alpha \ll \Delta\beta$, where $\Delta\beta=(2\pi c/\lambda^2)\cdot D\cdot\Delta\lambda^2$, c is the speed of light and $\lambda$ the transmission wavelength. See D. W. Peckham, A. F. Judy and R. B. Kummer, ECOC '98, paper TuA06, pp. 139–140. As can be seen, for a given set of values for $\Delta\lambda$, $n_2$ and $\alpha$, to decrease FWM efficiency one can increase the absolute value of dispersion and/or increase the value of fiber effective area $A_{\mathit{eff}}$. On the other hand, decreasing channel spacing dramatically increases FWM efficiency.

Other non-linear effects include Self Phase Modulation, Cross Phase Modulation, Stimulated Brillouin Scattering (SBS), and Raman Scattering (SRS). It is well known that a fiber with a larger effective area at the operating wavelength is less susceptible to all non-linear effects.

To solve the dispersion and non-linear effects associated with sending signals through long optical fibers, conventional systems use transmission lines that connect spans of optical fiber that have alternating dispersion values. For example, a span of negative dispersion fiber can be followed with a span of positive dispersion fiber to even out the overall dispersion over the transmission line. This approach ensures that the dispersion is non-zero at local values throughout the transmission line to avoid non-linear effects and that the total dispersion over the cumulative transmission line is compensated to nearly zero at the receiver.

Various publications discuss different approaches to solve these problems. For example, U.S. Pat. No. 4,969,710 to Tick et al. discusses an optical fiber transmission path wherein total dispersion of the system is compensated by the use of fibers composed of glasses with total dispersion of opposite signs at the operating wavelength for the system.

U.S. Pat. No. 5,343,322 to Pirio et al. discusses a system for long distance transmission of a digital signal. The system uses optical fiber having a low negative dispersion to connect receiver stations that include dispersion compensation devices having positive dispersions to compensate for the negative dispersion.

U.S. Pat. No. 5,559,920 to Chraplyvy et al. discusses an optical communication system having an initial span of a strong negative dispersion followed by positive dispersion spans. The system overcompensates for the negative dispersion in that the final dispersion value is not zero.

Other publications, such as U.S. Pat. No. 5,587,830 to Chraplyvy et al., U.S. Pat. No. 5,719,696 to Chraplyvy et al., U.S. Pat. No. 5,675,429 to Henmi et al., and U.S. Pat. No. 5,778,128 to Wildeman also discuss transmission lines for long range systems. These publications disclose transmission lines that use varying combinations of fiber that have either a negative dispersion or a positive dispersion at the operating wavelength. The negative dispersion fiber and the positive dispersion fiber are arranged so that the total dispersion of the system is compensated to approximately zero.

Similarly, U.K Patent No. 2 268 018 also discusses an optical transmission system that combines optical fiber having a negative dispersion with fiber having positive dispersion to compensate the dispersion to zero for the total length of the transmission.

European Patent Application No. 0 790 510 A2 discusses a symmetric, dispersion-managed fiber optic cable. The cable of this disclosure includes a conventional single mode fiber having a positive dispersion at the operating wavelength connected to a second optical fiber that has a negative dispersion at the operating wavelength.

U.S. Pat. No. 5,611,016 to Fangmann et al. discloses a dispersion-balanced fiber optic cable. The cable includes single mode fibers having opposite dispersion at the operating wavelength. A WDM system interconnects two dispersion-balanced cables with a crossover connection between the positive-dispersion fiber of one cable and the negative-dispersion fiber of the other cable. According to this patent, improved performance is achieved when the absolute value of the chromatic dispersion of the single-mode fibers at a wavelength of 1550 nm is in the range 0.8–4.6 ps/nm/km.

S. Bigo et al. in the paper '1.5 Terabit/s WDM transmission of 150 channels at 10 Gbit/s over 4×100 km of TeraLight™ fibre' PD2–9, pp. 40–41, ECOC'99 disclose a transmission line wherein four spans of 100 km of fiber having average chromatic dispersion of +8 ps/nm/km, a dispersion slope of 0.057 ps/nm²/km and an attenuation of 0.205 dB/km are interleaved with optical amplifiers including dispersion compensating fibers (DCF). Applicants have determined, based on the data provided in the paper, that the zero dispersion wavelength of the disclosed TeraLight™ fiber is lower than 1440 nm.

Applicants have noted that these prior arrangements use combinations of optical fiber that result in undesirably high levels of attenuation.

Applicants have faced the task of providing an optical fiber to be used in Dense and Hyper-Dense WDM transmission lines that reduces non-linear effects and at the same time minimizes attenuation and achieves a manageable dispersion.

SUMMARY OF THE INVENTION

In general, the present invention involves an optical fibre, an optical transmission line and an optical transmission system and method for transmitting optical signals over a significant distance. In particular, the invention involves an apparatus and method for reducing the attenuation and non-linear effects associated with the optical transmission.

In accordance with the purpose of the invention as embodied and broadly described herein, the invention is directed to a single mode optical transmission fiber. The fiber includes a core and a cladding. The core comprises an inner core that has a first refractive-index difference and a first glass layer surrounding the inner core and having a second refractive-index difference. The fiber has a peak refractive index difference less than or equal to about 0.0140, a zero-dispersion wavelength greater than 1450 nm and lower than 1500 nm, a dispersion value of between about 6 and 11 ps/nm/km at an operating wavelength of about 1560 nm, and an effective area of at least 60 $\mu m^2$. The fiber has a cable cutoff wavelength of less than about 1500 nm.

Advantageously, the fiber is housed within an optical fiber cable.

Applicants have noticed that the above combination of a dispersion of between about 6 ps/nm/km and 11 ps/nm/km at the operating wavelength and a zero dispersion wavelength between 1450 nm and 1500 nm, while resulting in a reduced FWM degradation, allows to achieve a relatively high value of the dispersion slope. Applicants have further noticed that a high dispersion slope corresponds in general to relatively high values of the effective area, that is itself associated with a beneficial decrease in nonlinear effects along the fiber. Accordingly the fiber is particularly advantageous for Dense or Hyper-Dense WDM transmission.

Preferably, the zero dispersion wavelength of the fiber is between about 1460 and 1490 nm.

Advantageously, the core of the fiber is free from negative refractive index difference layers.

Preferably, the fiber has a dispersion slope equal to or greater than about 0.06 ps/nm²/km and, even more preferably, equal to or greater than about 0.07 ps/nm²/km.

Preferably, the fiber has an effective area equal to or greater than about 65 $\mu m^2$, more preferably equal to or greater than about 70 $\mu m^2$.

Preferably, the effective area of the fiber is limited, for example to less than about 87 $\mu m^2$, to achieve compatibility with legacy fibers. Such an upper limit to the fiber effective area also gives the advantage of a limited bending sensitivity for the fiber at wavelengths above 1600 nm.

The fiber can advantageously have an attenuation lower than about 0.210 dB/km at a wavelength of 1560 nm, preferably lower than about 0.205 dB/km and, even more preferably, equal to or lower than about 0.200 dB/km.

Preferably, the dispersion of the fiber is between about 7 ps/nm/km and 10 ps/nm/km at a wavelength of 1560 nm.

In a first embodiment of the fiber the first refractive-index difference and the second refractive-index difference are greater than zero, with the second refractive-index difference being smaller than the first refractive-index difference.

Preferably, the first refractive-index difference is in the range of about 0.0100 to 0.0140 and the second refractive-index difference is in the range of about 0.0005 to 0.0030.

In a second embodiment the fiber comprises a second glass layer surrounding the first glass layer and having a third refractive-index difference. The first refractive-index difference is greater than zero, the second refractive-index difference is about zero, and the third refractive-index difference is greater than zero. Preferably the first refractive-index difference is between about 0.0090 and 0.0130 and the third refractive-index difference is between about 0.0020 and 0.0080.

In another aspect, the invention is directed to an optical transmission line that includes first and second spans of single-mode fiber. The fiber of the first span has a negative dispersion at an operating wavelength. The second span is connected to the first span and has a positive dispersion at the operating wavelength. The positive dispersion of the second span compensates for the negative dispersion of the first span such that the cumulative dispersion across the first and second spans is approximately zero.

The fiber of the second span is a half-dispersion-shifted fiber having a zero dispersion wavelength greater than 1450 nm and lower than 1500 nm. The positive dispersion of the second span is between about 6 ps/nm/km and 11 ps/nm/km at the operating wavelength.

Preferably, the operating wavelength is of about 1560 nm.

Advantageously, a ratio of the length of the first span to the length of the second span is less than about 6:1, preferably less than about 4:1.

Preferably, the positive dispersion of the half-dispersion-shifted fiber is between about 7 ps/nm/km and 10 ps/nm/km at the operating wavelength.

Preferably, an effective area for the fiber of the second span is greater than 60 $\mu m^2$, more preferably greater than 65 $m^2$, even more preferably greater than 70 $\mu m^2$.

Preferably, the effective area of the fiber is limited, for example to less than about 87 $\mu m^2$, to achieve compatibility with legacy fibers.

Preferably the half-dispersion-shifted fiber has an attenuation lower than about 0.210 dB/km at the operating wavelength, more preferably lower than about 0.205 dB/km and, even more preferably, equal to or lower than about 0.200 dB/km.

Advantageously, the core of the fiber is free from negative refractive index difference layers.

Preferably, the half-dispersion-shifted fiber has a dispersion slope equal to or greater than about 0.06 ps/nm$^2$/km and, even more preferably, equal to or greater than about 0.07 ps/nm2/km.

According to an embodiment, the first span of negative dispersion fiber may be a dispersion-compensating-fiber having negative dispersion in the range from −300 to −50 ps/nm/km, preferably about −100 ps/nm/km, preferably in the configuration of a compact module. Advantageously, the dispersion-compensating-fiber has a negative dispersion slope.

According to another embodiment, the first span of negative dispersion fiber may be a fiber having very-high negative dispersion in the range from −50 to −10 ps/nm/km, either cabled or in compact module configuration. Advantageously, the very-high negative dispersion fiber has a negative dispersion slope.

According to yet another embodiment, the first span of negative dispersion fiber may be a fiber having high negative dispersion in the range from −10 to −2 ps/nm/km, preferably in the range from −8 to −4 ps/nm/km, preferably in cable configuration. The negative dispersion fiber may have a negative dispersion slope.

Applicants have determined that the selection and arrangement of optical fibers for the optical transmission line of the invention leads to an improved attenuation and lower non-linear effects than in a conventional transmission line. In still another aspect, the invention is directed to a high-speed optical communications system having an operating wavelength. The high-speed communications system includes a transmission line having first and second spans.

Each of the first and second spans has at least one single-mode fiber. The fiber of the first span has a negative dispersion at an operating wavelength. The fiber of the second span has a positive dispersion at the operating wavelength. The positive dispersion of the second span compensates for the negative dispersion of the first span such that the cumulative dispersion across the first and second spans is approximately zero. There is also provided a transmitting device coupled to one end of the transmission line and a receiving device coupled to the other end. The transmitting device sends a signal across the transmission line to the receiving device.

The fiber of the second span is a half-dispersion-shifted fiber having a zero dispersion wavelength greater than 1450 nm and lower than 1500 nm. The positive dispersion of the second span is between about 6 ps/nm/km and 11 ps/nm/km at the operating wavelength.

Preferred and advantageous features of the invention high-speed optical communications system can be derived from the corresponding preferred and advantageous features of the optical transmission line of the invention, as described above.

In yet another aspect, the invention is directed to a method of transmitting a signal over a transmission line. The method includes the step of adding the signal to the transmission line. The signal is transmitted over a first span of single mode optical fiber that has a negative dispersion at an operating wavelength. The signal is then guided down a second span of single mode optical fiber that has a positive dispersion at the operating wavelength to compensate for the negative dispersion of the first span. The second span of fiber compensates the total dispersion over the transmission line to approximately zero. The signal is then dropped from the transmission line.

The fiber of the second span is a half-dispersion-shifted fiber having a zero dispersion wavelength greater than 1450 nm and lower than 1500 nm. The positive dispersion of the second span is between about 6 ps/nm/km and 11 ps/nm/km at the operating wavelength.

Advantageously the signal is added to the transmission line with a transmitting device. Advantageously the signal is dropped from the transmission line with a receiving device.

Other preferred and advantageous features of the invention method of transmitting a signal over a transmission line can be derived from the corresponding preferred and advantageous features of the optical transmission line of the invention, as described above.

Throughout the present description reference is made to refractive index profiles of optical fibers. The refractive index profiles comprise various radially arranged sections. Reference is made in the present description to precise geometrical shapes for these sections, such as gaussian and super-gaussian. As is well known to one of ordinary skill in the art, fiber manufacturing process may introduce changes in the shape of the structural sections of the described, idealized, refractive index profiles, such as irregular shapes different from the above mentioned regular shapes. It has been shown in the literature, however, that these differences do not change the fiber characteristics if they are kept under control.

In general, a refractive index profile section has an associated effective refractive index profile section which is different in shape. An effective refractive index profile section may be substituted, for its associated refractive index profile section without altering the overall waveguide performance. For example, see "Single Mode Fiber Optics", Luc B. Jeunhomme, Marcel Dekker Inc., 1990, page 32, section 1.3.2 or U.S. Pat. No. 4,406,518 (Hitachi). It will be understood that disclosing and claiming a particular refractive index profile shape, includes the associated equivalents, in the disclosure and claims.

Moreover, it is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated and constitute a part of this specification, illustrate several embodiments of the invention, and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Unless otherwise indicated, the fiber parameters are referred to a wavelength of 1550 nm.

In accordance with the present invention, a high-speed optical communications system is provided. The high-speed optical communications system includes a transmitting device for adding a signal to a transmission line. A receiver is provided to receive the signal from the transmitting device. An optical communication system is illustrated in FIG. 1 and is generally designated by reference number 10.

Figure 1:
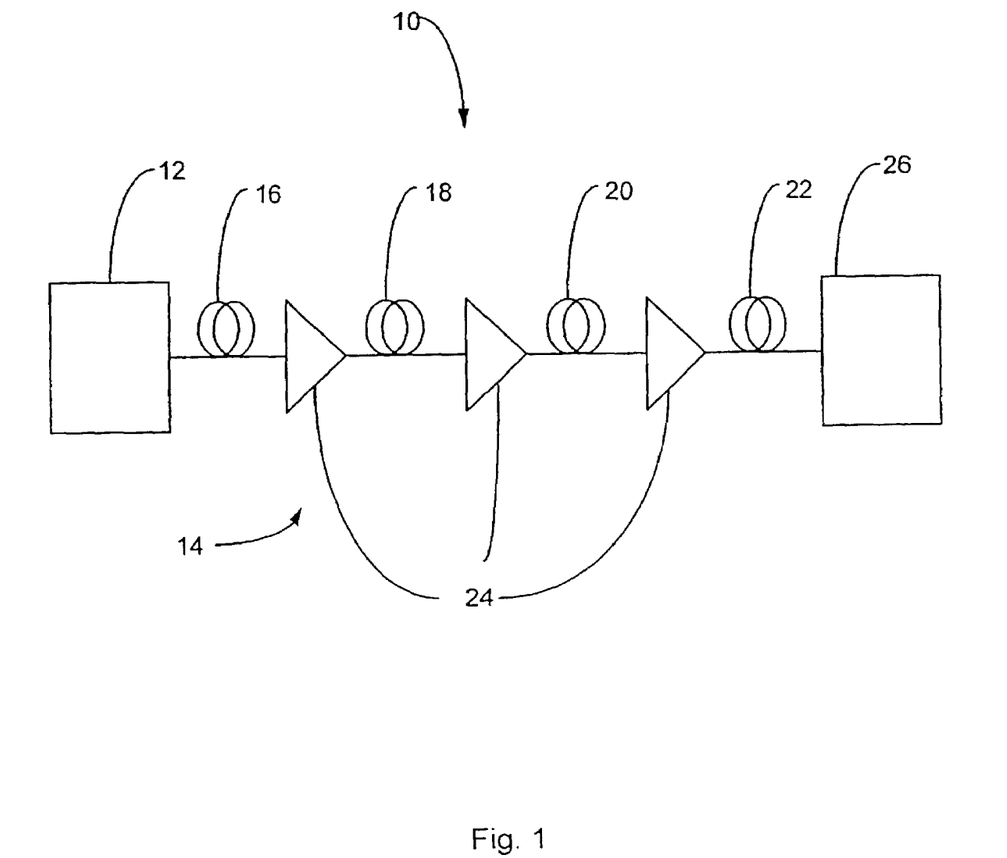
FIG. 1 is a schematic diagram illustrating an optical transmission system in accordance with the present invention.

As illustrated in FIG. 1, the optical communications system 10 includes a transmitting device 12, a transmission line 14, and a receiving device 26. Transmitting device 12 adds a signal to transmission line 14. Preferably, an operating wavelength of the transmitting device is at around 1560 nm. However, the WDM channels may have wavelengths in the range 1500–1625 nm, for example.

The present invention contemplates the use of any device or combination of devices readily apparent to one skilled in the art to add the signal to the transmission line. The transmitter 12 could include, for example, a DFB laser modulated directly or externally, e.g. with a Mach-Zehnder interferometer, or a combination of such devices in a WDM configuration. As well, transmitter 12 could comprise wavelength converters for receiving signal wavelengths from a separate transmission network and converting the carrier wavelengths to characteristic wavelengths in a conventional manner.

The optical communication system is capable of supporting any type of communication protocols for the transmitted signals, such as NRZ (non return to zero) or, in alternative, RZ (return to zero), e.g., soliton-like. Furthermore, the system is not limited to a specific bit rate. Exemplary values for the bit rate are 2.5 Gbit/s, 10 Gbit/s, 40 Gbit/s.

In accordance with the present invention, the transmission line 14 includes at least one optical fiber. However, the present invention also contemplates the use of multiple fibers in the same transmission line to increase the signal carrying capacity of the line. The multiple fibers can be bound together in a cable.

In accordance with the present invention, system 10 may include various optical amplifiers 24 positioned between fiber spans of the transmission line 14. The amplifiers 24 may comprise erbium-doped fiber amplifiers for amplifying signals within the 1550 nm transmission window (also called C-band). The amplifier may also comprise erbium-doped fiber amplifiers for amplifying signals within the 1585 nm transmission window (also called L-band). As well, system 10 may include an optical add/drop multiplexer (OADM, not shown), for dropping or adding signals to system 10, particularly in a WDM configuration. OADM and amplifiers 24 may be of any type commonly known in the art. Finally, system 10 may include receiver 26 connected directly to optical fiber 22 or coupled to optical fiber 22 through other intermediate components. Receiver 26, as readily known in the field, may include a router, demultiplexer, and the like to assist with deciphering the information carried in the optical signals.

By the term "coupled", it is meant that two physical devices are joined by a common optical path and possibly, although not necessarily, physically adhered. Applicants use the terms "coupled" and "connected" interchangeably in describing the invention, and those of skill in the art will appreciate that the various components identified herein need not be physically attached to each other to provide the optical coupling that assists in achieving the beneficial results of the invention.

As shown in FIG. 1, transmission line 14 includes a first span 16 and second span 18. In the exemplary embodiment, transmission line 14 may also include additional spans 20 and 22. Each span includes at least one single-mode fiber. The present invention also contemplates the use of multiple fibers within each span to increase the signal carrying capacity of the transmission line.

As is well known in the art, the fiber within each span 16, 18, 20 and 22 has a certain attenuation and dispersion at the operating frequency. The cumulative attenuation and dispersion of the signal over the transmission line accumulates as the signal travels through each span. Amplifiers 24 may be placed between the spans 16, 18, 20, and 22 to increase the power of the signal to account for the attenuation of the signal.

The dispersion of the signal may be corrected by connecting fibers that have dispersions with an opposite sign. For example, first span 16 may have a negative dispersion and second span 18 may have a positive dispersion. The negative dispersion of the first fiber will cause the cumulative dispersion to become more negative along the length of fiber 16. The positive dispersion of the second span 18 compensates for the negative dispersion of the first span to bring the cumulative dispersion over the transmission line 14 to approximately zero, e.g., to a value that is sufficiently low, depending on the system characteristics such as signal format, bit rate and wavelength range, to substantially alleviate the problems linked with chromatic dispersion. Thus, the first and second spans are selected with dispersion values and lengths so that the cumulative dispersion reaches about zero at the termination point of receiver 26.

Figure 2:
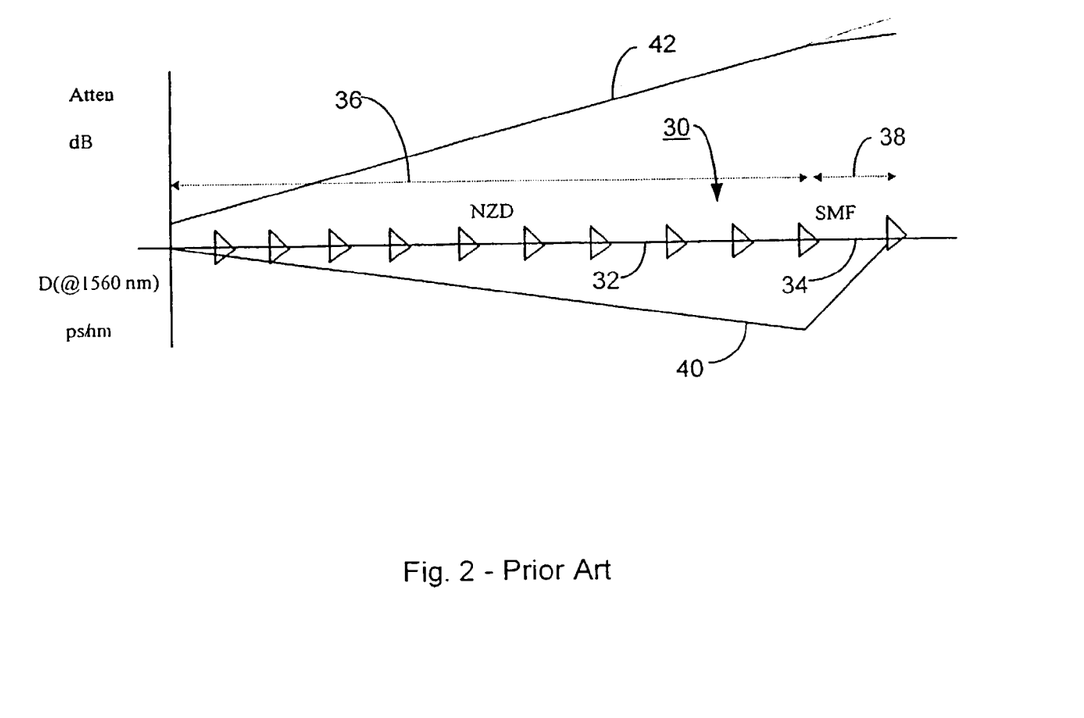
FIG. 2 is a schematic diagram of a transmission line of an optical transmission system according to the prior art, illustrating the cumulative dispersion and attenuation of a signal over the transmission line.

There are many known long distance optical transmission systems. An example of a conventional transmission line having fibers with dispersions of opposite sign is illustrated in FIG. 2. As illustrated in FIG. 2, the conventional transmission line 30 includes a series of negative dispersion fiber spans 32 followed by a positive dispersion fiber span 34. The cumulative attenuation of transmission line 30 is indicated by line 42. Span 34 of single-mode fiber has an attenuation of a lower value than that of spans 32, as shown on line 42 for the overall attenuation of the transmission line. The thin line indicates, for comparison purposes, the attenuation the line would have if span 34 were of the same negative dispersion fiber used for spans 32. The total length of the spans of negative dispersion fiber 32 is indicated by line 36, and the length of positive dispersion fiber 34 is indicated by line 38. The cumulative dispersion of the transmission line at 1560 nm is indicated by line 40.

In this exemplary embodiment of a conventional transmission line, negative dispersion fiber span 32 is composed of conventional Non-Zero Dispersion (NZD) fiber. The NZD fiber has a negative dispersion of approximately −2 ps/nm/km at 1560 nm and an attenuation of approximately 0.210 dB/km. As shown in FIG. 2, these values cause the cumulative dispersion of line 40 to gradually decrease in absolute value and the cumulative attenuation of line 42 to gradually increase along the fiber spans 32 of the length 36. In contrast, the positive dispersion span 34 is conventionally composed of single-mode fiber (SMF) having a dispersion of approximately +18 ps/nm/km at 1560 nm and an attenuation of approximately 0.190 dB/km. As shown in FIG. 2, these values for the SMF fiber cause the cumulative dispersion of line 40 to approach zero level and the cumulative attenuation of line 42 to increase at a lower rate than a corresponding NZD fiber along the fiber span 34 of length 38. The lengths of negative dispersion span 36 and positive dispersion span 38 are sized such that the total dispersion 40 of the transmission line approaches approximately zero at the end of the transmission line.

Alternatively, transmission lines as shown in FIG. 2 may use a Pure Silica Core (PSC) fiber to compose the positive dispersion span 34. This fiber has a dispersion of about +19 ps/nm/km at 1560 nm and an attenuation of about 0.180 dB/km. In comparison with the typically used SMF fiber, the PSC fiber has a lower attenuation and slightly higher dispersion. As shown in the examples that follow, the use of this fiber will result in a smaller attenuation over the entire system than that of the SMF fiber.

In accordance with the present invention, the transmission line includes a first span having at least one single-mode fiber having a negative dispersion value at the operating wavelength connected to a second span having at least one single-mode fiber having a positive dispersion value at the operating wavelength.

The negative dispersion fiber is a fiber having high negative dispersion in the range from −10 to −2 ps/nm/km, preferably in the range from −8 to −4 ps/nm/km. The negative dispersion fiber may have a negative dispersion slope. Preferably the negative dispersion fiber is cabled.

The positive dispersion fiber is a half-dispersion-shifted fiber (HDSF). The half-dispersion-shifted fiber has a zero-dispersion wavelength greater than 1450 nm and lower than 1500 nm, a peak refractive index difference of less than or equal to about 0.0140, and an effective area of at least 60 $\mu m^2$. The cabled fiber has a cutoff wavelength of less than about 1500 nm. Advantageously, the half-dispersion-shifted fiber has an attenuation equal to or less than about 0.210 dB/km at a wavelength of 1560 nm.

Preferably the half-dispersion-shifted fiber has an attenuation equal to or less than about 0.205 dB/km, even more preferably equal to or less than about 0.200 dB/km at a wavelength of 1560 nm. Advantageously, the peak refractive index difference is less than or equal to about 0.0130. Preferably, the effective area is of at least 65 $\mu m^2$, and even more preferably of at least 70 $\mu m^2$. Advantageously, the core of the half-dispersion-shifted fiber is free from negative refractive index difference layers. The dispersion at the preferred operating wavelength of 1560 nm is between about 6 ps/nm/km and 11 ps/nm/km, preferably between about 7 ps/nm/km and 10 ps/nm/km. Thus, the half-dispersion-shifted fiber has a lower dispersion than the conventionally used SMF fiber and than PSC fiber. To account for the lower dispersion, a longer span of half-dispersion-shifted fiber will be needed to compensate for the negative dispersion. The present invention contemplates that the ratio of negative dispersion fiber to half-dispersion-shifted fiber will be not greater than about 6:1, preferably not greater than about 4:1. As shown in the examples set forth below, the use of half-dispersion-shifted fiber will result in a reduction in total attenuation over the system as well as in a reduction of overall non-linear effects. Another advantage of the half-dispersion-shifted fiber is relatively low attenuation, in connection with a low dopant content achieved by relatively low values for the peak refractive index difference. The embodiments of the half-dispersion-shifted fiber having no down-doped areas in the core, i.e., no negative refractive index difference layers, achieve the additional advantage of a reduced attenuation resulting from the relatively low dopant content. Moreover, avoidance of down dopants, such as fluorine, significantly simplifies the production process.

The present invention contemplates that the half-dispersion-shifted fiber may have any refractive-index profile that is readily apparent to one skilled in the art as capable of achieving the transmission characteristics described herein. The refractive index may have, for example, a peak-on-pedestal shape, a peak-and-ring shape or a double-peak shape. Double-peak profile fibers are disclosed in patent application EP0965866 assigned to the same Assignee of the present application.

Figure 3:
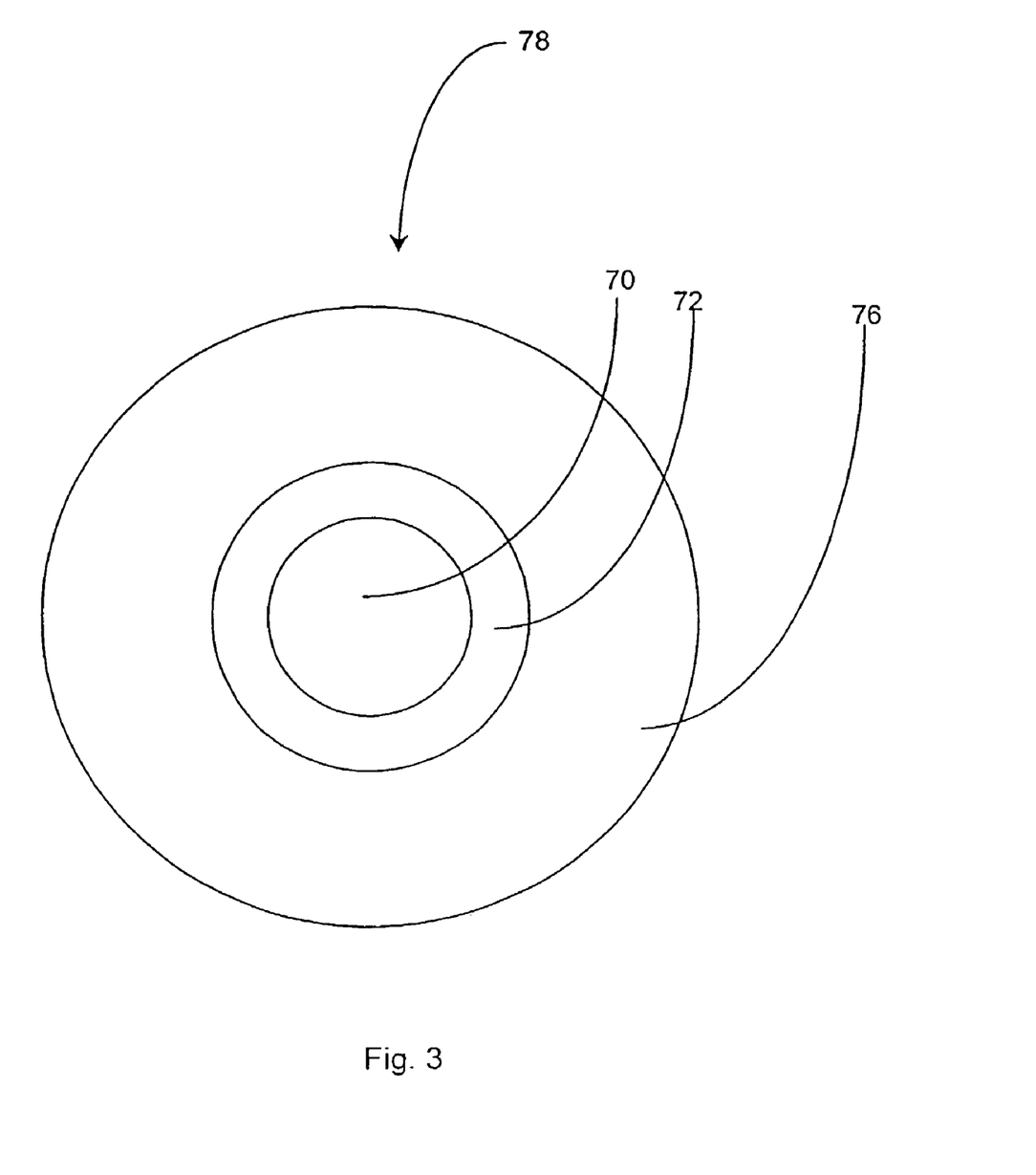
FIG. 3 is a cross sectional view of an embodiment of a half-dispersion-shifted fiber according to the present invention.
Figure 4:
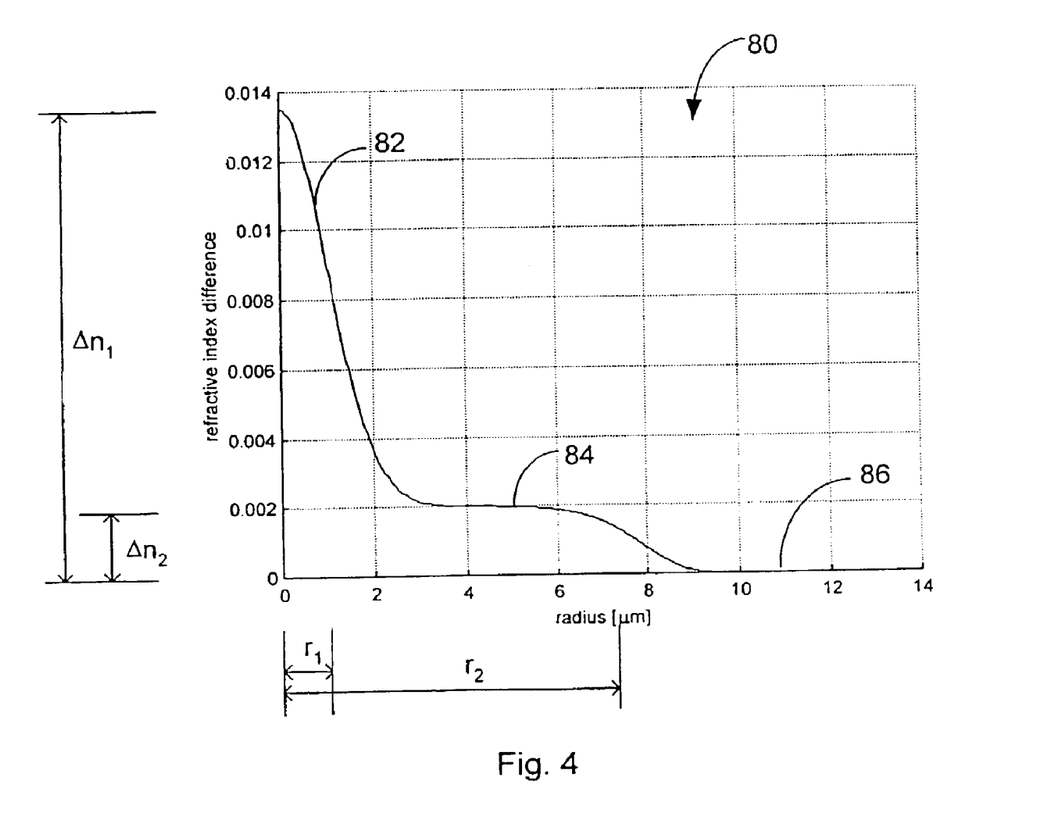
FIG. 4 is a graph illustrating the refractive-index profile of the fiber of FIG. 3.

A peak-on-pedestal profile for a half-dispersion-shifted fiber 18 is illustrated in FIG. 4. Fiber 18 has a cross section as illustrated in FIG. 3, and includes an inner 30 core 70, a first glass layer 72, and a cladding 76, each having a certain refractive-index difference. The various layers comprising the optical fiber of FIG. 4 may contain refractive index-modifying dopants each as $GeO_2$ or other well-known dopants to vary the refractive-index profile. The choice of dopants and concentrations to attain the disclosed profiles is within the skill of the ordinary artisan.

As readily known to those of ordinary skill in the art, refractive-index difference refers to the relative difference in refractive index between a given layer of glass and refractive index of pure silica ($SiO_2$). That is, the refractive-index difference $\Delta n_1$ of inner core 70 equals ($n_1 - n_{silica}$). Furthermore, following the standard notation in the field of optical fibers, it is understood throughout the present description and claims that refractive index differences are referred to the cladding ($\Delta n = n - n_{cladding}$) whenever the cladding includes dopants that make the refractive index of the optical cladding in the drawn fiber different from the refractive index of pure silica.

As shown in FIG. 4, the peak-on-pedestal refractive-index profile 80 is characterized by a peak 82 and an outer area (pedestal) 84. A cladding 86 with substantially constant refractive index surrounds outer area 84. The peak-on-pedestal refractive-index profile can be modeled as a super-position of two super-gaussian profiles regions, one modeling the inner core region and having an exponent equal to about 2 and the second modeling the base and having an exponent equal to about 10.

The radii $r_1$, $r_2$ of the two regions of the profile are defined as the "sigma" of the super-gaussian that models the region, according to the following formula for the refractive-index difference as a function of radius:

$$\Delta n(r) = (\Delta n_1 - \Delta n_2)\exp\left(-0.5 * \left(\frac{r}{r_1}\right)^2\right) + \Delta n_2 \exp\left(-0.5 * \left(\frac{r}{r_2}\right)^{10}\right)$$

As shown in FIG. 4, first glass layer 72 forms peak 82 and extends from the fiber axis to an outer radius $r_1$ of about 1.0 μm and has a peak refractive-index difference $\Delta n_1$ in the range of about 0.0100 to 0.0140. In the present example, first glass layer 72 has a peak refractive-index difference $\Delta n_1$ of about 0.0135.

Second glass layer 74 forms outer area 84 and extends to an outer radius $r_2$ of about 7.5 μm and has a peak refractive-index difference $\Delta n_2$ in the range of about 0.0005 to 0.0030. In the present example, second glass layer 74 has a peak refractive-index difference $\Delta n_2$ of about 0.0020.

The refractive-index profile 80 of this example yields a fiber having the following transmission characteristics: a cut-off wavelength for the cabled fiber of about 1300 nm, a dispersion of 8.9 ps/nm/km at the 1560 nm wavelength, a dispersion slope of 0.087 ps/nm$^2$/km, a zero dispersion wavelength of 1458 nm, a mode field diameter of 10.1 μm, an effective area of 77 μm$^2$, a non-linearity coefficient of 1.15 W$^{-1}$ km$^{-1}$, a macrobending coefficient of 0.01 dB/km, and a microbending coefficient of 7 (dB/km)/(g/mm).

In the framework of the present work the macrobending coefficient is referred to a loss measurement at 1550 nm for the fiber bent on a 60 mm diameter mandrel, while the microbending coefficient is referred to a measurement at 1550 nm according to the expandable bobbin method, as described for example in G. Grasso and F. Meii "Microbending losses of cabled single-mode fibers", ECOC '88, pp. 526-ff., or in G. Grasso et al. "Microbending effects in single-mode optical cables", International Wire and Cable Symposium, 1988, pp. 722-ff.

Figure 5A:
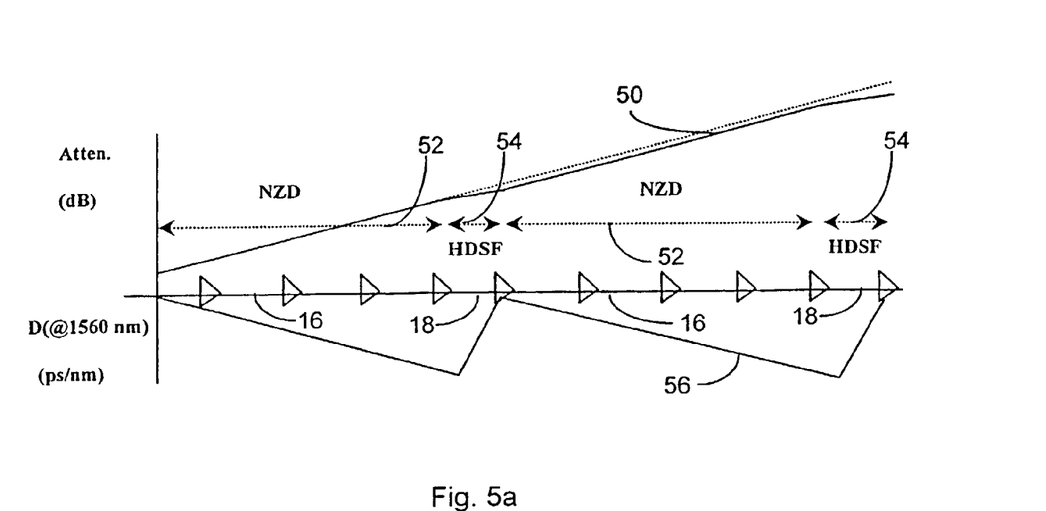
FIG. 5a is a schematic diagram of an embodiment of a transmission line according to the present invention, illustrating the cumulative dispersion and attenuation of a signal over a transmission line that combines spans of NZD fiber and half-dispersion-shifted fiber.

FIG. 5a depicts a first embodiment of the optical-transmission line according to the present invention. In this embodiment, negative dispersion spans 16 are NZD fiber having a dispersion of about −2 ps/nm/km and an attenuation of about 0.210 dB/km at 1560 nm. Positive dispersion spans 18 are HDSF fibers having a dispersion of about +8 ps/nm/km and an attenuation of about 0.195 at 1560 nm. The lengths of negative dispersion spans 16 are indicated by lines 52 and the lengths of positive dispersion spans 18 are indicated by lines 54. The cumulative dispersion of the transmission line at 1560 nm is indicated by line 56, and the cumulative attenuation of the transmission line is indicated by line 50.

Figure 5B:
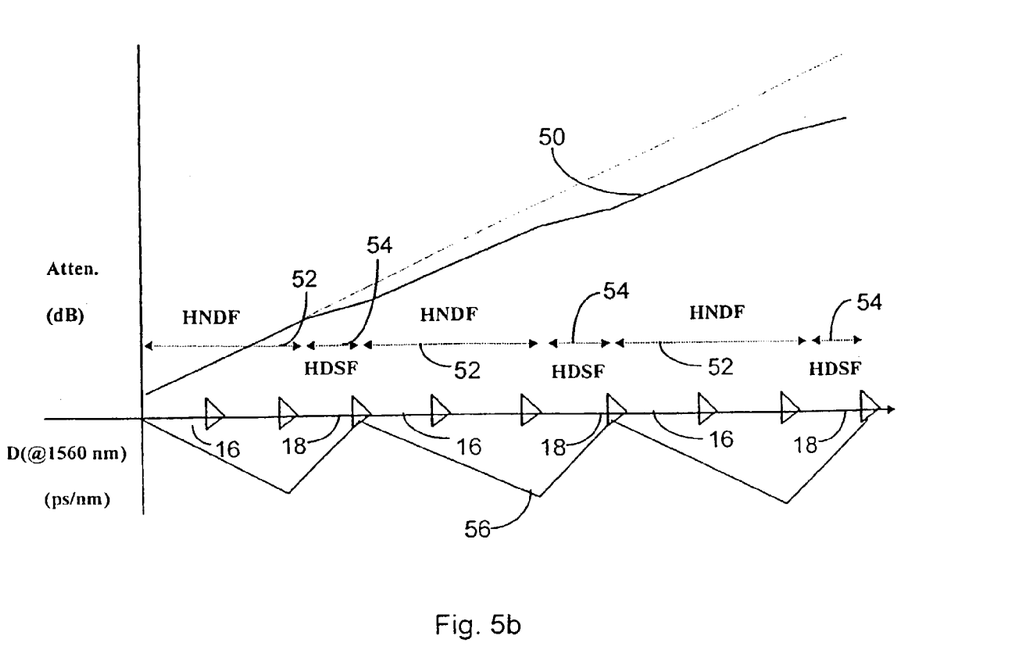
FIG. 5b is a schematic diagram of another embodiment of a transmission line according to the present invention, illustrating the cumulative dispersion and attenuation of a signal over a transmission line that combines spans of high-negative-dispersion fiber and half-dispersion-shifted fiber.

FIG. 5b depicts a second embodiment of the optical-transmission line according to the present invention. In this embodiment, negative dispersion spans 16 are High Negative Dispersion Fiber (HNDF), of the type disclosed in patent application N° WO1999EP9962 assigned to the same assignee of the present application, having a dispersion of about −4.5 ps/nm/km and an attenuation of about 0.210 dB/km at 1560 nm. Positive dispersion spans 18 are half-dispersion shifted fiber having a dispersion of about +8 ps/nm/km and an attenuation of about 0.195 at 1560 nm. The lengths of negative dispersion spans 16 are indicated by lines 52 and the lengths of positive dispersion spans 18 are indicated by lines 54. The cumulative dispersion of the transmission line at 1560 nm is indicated by line 56, and the cumulative attenuation of the transmission line is indicated by line 50.

Comparing FIGS. 5a and 5b with FIG. 2, it is apparent that the present invention provides an arrangement that includes the use of several spans of positive-dispersion fiber 18, which lowers the overall attenuation and non-linear effects compared with conventional arrangements. The length 52 of the negative span and the length 54 of the positive span are chosen such that the positive dispersion will compensate for the negative dispersion span to bring the total dispersion 56 to approximately zero, e.g., to a value that is sufficiently low, depending on the system characteristics such as signal format, bit rate and wavelength range, to substantially alleviate the problems linked with chromatic dispersion. Preferably, the ratio of the negative dispersion span length to the positive dispersion span length will be less than about 6:1, more preferably less than 4:1.

The dispersion of the positive span of the present invention being smaller than the dispersion of the corresponding span of the conventional line, the length of the positive span in the present invention is greater than in a corresponding conventional line, to compensate for the decreased dispersion. Applicants have identified that the attenuation of the fiber used for the positive span is in general less than the attenuation of fiber used for the negative span in the line. The length of the negative span is decreased according to the present invention. Accordingly, the overall attenuation of the line is reduced.

Furthermore, by transmitting the signal at a wavelength where the dispersion has an absolute value that is significantly greater than zero along the whole line, the problem of FWM and XPM is avoided even with dense channel spacing and high signal power, as previously discussed. Thus, the transmission line of the present invention is well suited for use with Dense and Hyper Dense WDM technology, where channel spacing is smaller than or equal to 100 GHz, or about 0.8 nm.

In addition, the transmission line of the present invention is less susceptible to all non-linear effects, including Self Phase Modulation (SPM), Stimulated Brillouin Scattering (SBS), and Stimulated Raman Scattering (SRS). This is linked with the fact that in the present invention the length of the positive dispersion span portion, which has an effective area greater than the negative dispersion span portion, is greater than the length of the positive dispersion span portion of conventional systems.

The following tables illustrate the attenuation gain of the various embodiments of the transmission system of the present invention as compared to the conventional transmission systems. Each example is based on transmission line having a length of 800 km.

Table 1 identifies the fiber specifications of two system configurations including a conventional system and a system using NZD and PSC fiber as compared to two exemplary embodiments of the present invention, i.e., the Half Dispersion Shifted Fiber (HDSF) used with either a conventional Non Zero Dispersion single-mode fiber (NZD), or a High Negative Dispersion Fiber (HNDF).

TABLE 1

| System Type | Neg. Disp. Fiber Type/ Disp. Value (ps/nm/km) at 1560 nm | Length (km)/ Attenuation (dB/km) at 1560 nm | Pos. Disp. Fiber Type/ Disp. Value (ps/nm/km) at 1560 nm | Length (km)/ Attenuation (dB/km) at 1560 nm |
|---|---|---|---|---|
| Config. #1 | NZD/−2 | 720/0.210 | SMF/+18 | 80/0.190 |
| Config. #2 | NZD/−2 | 725/0.210 | PSC/+19 | 75/0.180 |
| Embod. #1 | NZD/−2 | 640/0.210 | HDSF/+8 | 160/0.195 |
| Embod. #2 | HNDF/−4.5 | 510/0.210 | HDSF/+8 | 290/0.195 |

Table 2 summarizes the total system attenuation for each system in Table 1 and shows the improvement (decrease) in attenuation as compared to the conventional system.

TABLE 2

| System Type | Total System Attenuation (dB) at 1560 nm | Attenuation Decrease at 1560 nm (dB) |
|---|---|---|
| Configuration #1 | 166.4 | — |
| Configuration #2 | 165.7 | 0.7 |
| Embodiment #1 | 165.5 | 0.8 |
| Embodiment #2 | 163.6 | 2.8 |

As shown in Tables 1 and 2, the selection and arrangement of optical fibers for the embodiments of the present invention lead to an improved attenuation and lower non-linear effects than in a conventional system. In particular, as shown in Table 2, the embodiments of the invention using NZD and HNDF fiber for the negative dispersion spans lower the system attenuation by 0.8 dB and 2.8 dB, respectively.

Figure 6:
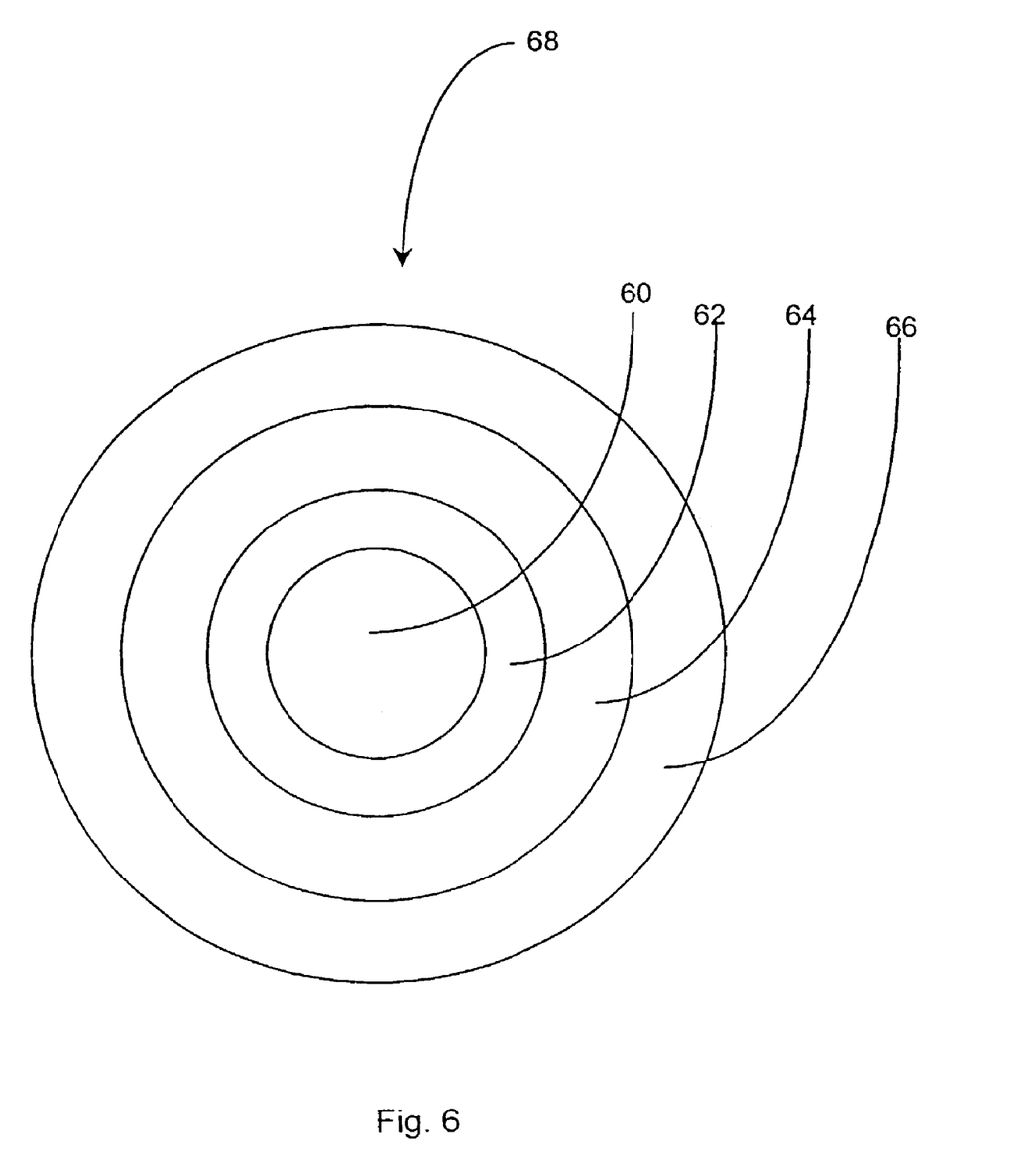
FIG. 6 is a cross sectional view of another preferred embodiment of a half-dispersion-shifted fiber according to the present invention.
Figure 7:
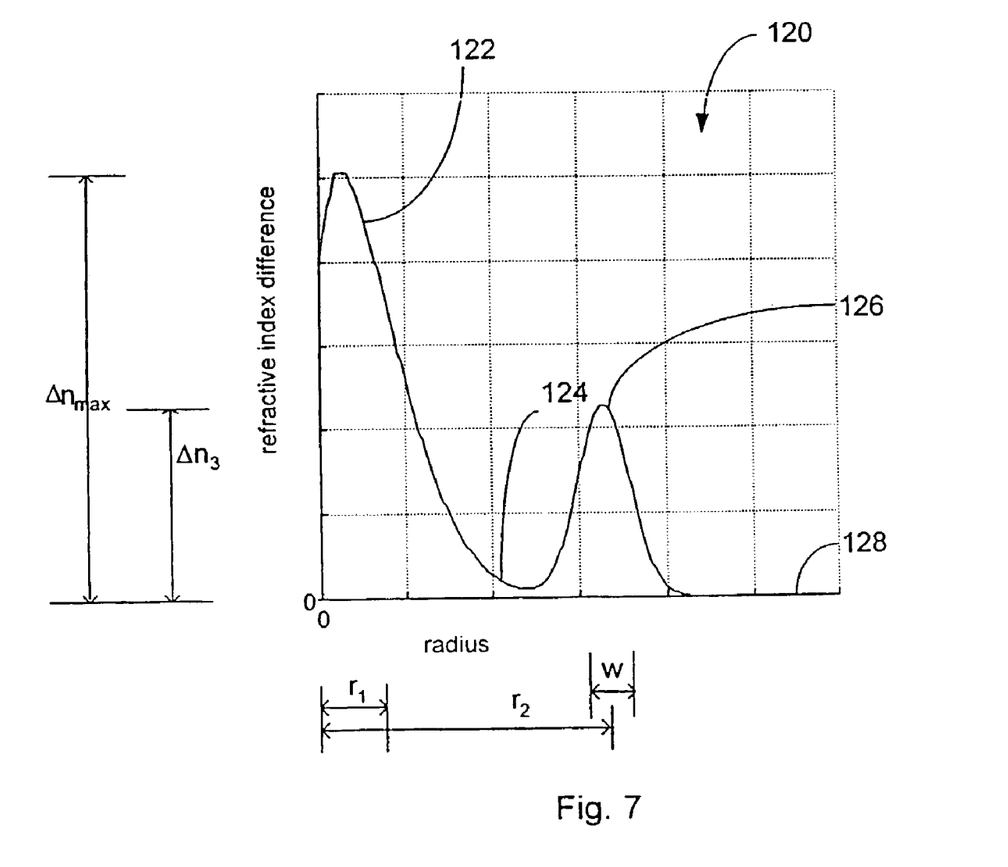
FIG. 7 is a graph illustrating the schematic refractive-index profile of the fiber of FIG. 6.

As shown in FIG. 7, in another, preferred, embodiment of a half-dispersion-shifted fiber, the refractive-index profile 120 may have a peak-and-ring shape. As shown in FIG. 6, fiber 68 includes an inner core 60, a first glass layer 62, a second glass layer 64, and a cladding 66. As shown in FIG. 7, the peak-and-ring profile 120 is characterized by a first peak 122 and a second peak 126, separated by an area of substantially constant refractive index 124. A cladding 128 with substantially constant refractive index surrounds second peak 126.

Half-dispersion-shifted fiber 68 having refractive-index profile 120 of FIG. 7 has the following transmission characteristics: a cabled cut-off wavelength of less than 1500 nm (preferably less than 1450 nm), a dispersion of between about 6.0 ps/nm/km and 11.0 ps/nm/km (preferably between about 7.0 ps/nm/km and 10.0 ps/nm/km) at 1560 nm, an effective area of greater than 60 $\mu m^2$ (preferably greater than 70 $\mu m^2$) at 1550 nm, a macrobending coefficient of less than or equal to 0.01 dB/km, and a microbending coefficient of less than or equal to 10 (dB/km)/(g/mm) (preferably less than or equal to 6 (dB/km)/(g/mm)).

The peak-and-ring refractive-index profile can be modeled as the sum of two gaussian-curves, one modeling the inner core region and the second the outer ring.

In addition, the model takes into account the dip along the center axis of the fiber that can occur during fabrication, in particular with the OVD and MCVD processes. The model used for the dip is an inverted cone followed by a constant refractive index region. The dip has the effect of reducing the actual refractive index difference along the axis of the fiber with respect to the nominal value $\Delta n_1$. The maximum refractive index difference ($\Delta n_{max}$) is thus achieved near the axis of the fiber and is, for example, about 80% of the value $\Delta n_1$.

The parameters $r_1$, $r_2$ and w of the regions of the profile are defined according to the gaussian curve that models the region, according to the following formula for the refractive-index difference as a function of radius:

$$\Delta n(r) = \Delta n_1 \exp\left(-0.5 * \left(\frac{r}{r_1}\right)^2\right) + \Delta n_3 \exp\left(-0.5 * \left(\frac{r - r_2}{w}\right)^2\right)$$

As shown in FIG. 7, inner core 60 has a radius $r_1$. A preferred range for $r_1$ is between about 1.0 and 1.8 microns. Between the center axis of the fiber and its outer radius, inner core 60 includes a refractive index-increasing dopant, such as $GeO_2$ or the like, that produces a peak index of refraction at or near the axial center of fiber 68 and a minimum for the inner core at its outer radius. The peak refractive-index difference in inner core 60 is $\Delta n_{max}$. A preferred range for $\Delta n_{max}$ is between about 0.0090 and 0.00130. The concentration of the refractive index-increasing dopant decreases from the center of inner core 60 to its outer radius so as to produce a profile having a graded shape.

If it is present, the dip may have a radius of between about 0.2 and 1 micron, for example of about 0.35 microns.

First glass layer 62 surrounds the inner core 60 and is characterized by an index of refraction across its width that is less than the index of refraction of inner core 60. First glass layer 62 extends from the outer radius of inner core 60 to the inner radius of the second glass layer 64. Preferably, first glass layer 62 is made of glass with a refractive-index difference of about 0. In practice, first glass layer 62 may have an actual refractive index difference greater than zero diffusion tails occurring in proximity of the peaks during fiber production. In particular, when the second glass layer 64 is close enough to the axis or wide enough, its inner tail may overlap with the outer tail of the inner core 60.

Second glass layer 64 surrounds first glass layer 62. Second glass layer 64 extends over a width w and has a center-line radius $r_2$. A preferred range for w is between about 0.6 and 1.1 microns. A preferred range for $r_2$ is between about 5 and 7 microns. As shown in FIG. 7, second glass layer has a maximum index of refraction $\Delta n_3$ within its width. A preferred range for $\Delta n_3$ is between about 0.0020 and 0.0080. Second glass layer 64, like inner core 60, has its refractive-index difference increased by doping the width of the glass layer with $GeO_2$ or other well-known refractive index-increasing dopants.

Finally, a light conducting cladding 66 surrounds the second glass layer 64 in a conventional manner to help guide light propagating along the axis of fiber 68. Cladding 66 preferably has a refractive-index difference substantially equal to 0, but may include dopants that do not raise its index of refraction above that of the maximum indices of refraction 122 and 126 of the inner core and the second layer.

Table 3 shows the parameters of five different examples of the peak-and-ring embodiment of the present invention.

TABLE 3

|  | Example 1 | Example 2 | Example 3 | Example 4 | Example 5 |
|---|---|---|---|---|---|
| $\Delta n_{max}$ | 0.0101 | 0.0115 | 0.0098 | 0.0113 | 0.0128 |
| $\Delta n_3$ | 0.0046 | 0.0037 | 0.0031 | 0.0040 | 0.0040 |
| $r_1$ (μm) | 1.6 | 1.3 | 1.6 | 1.3 | 1.09 |
| $r_2$ (μm) | 6.6 | 5.8 | 6.1 | 5.6 | 5.2 |
| w (μm) | 0.6 | 0.9 | 0.9 | 0.9 | 1.0 |

The transmission characteristics of the exemplary fibers of Table 3 are given in Table 4.

TABLE 4

|  | Example 1 | Example 2 | Example 3 | Example 4 | Example 5 |
|---|---|---|---|---|---|
| Dispersion (@ 1560 nm) (ps/nm/km) | 6.3 | 6.2 | 8.7 | 8.6 | 8.8 |
| Slope (@ 1560 nm) (ps/nm²/km) | 0.086 | 0.097 | 0.084 | 0.094 | 0.098 |
| Zero dispersion wavelength (nm) | 1489 | 1495 | 1460 | 1472 | 1476 |
| MFD (@ 1550 nm) | 9.7 | 9.9 | 10.1 | 10.3 | 10.4 |
| Effective Area (@ 1550 nm) | 71.5 | 76.5 | 76.1 | 82.8 | 86.4 |
| Non-linearity coefficient ($W^{-1}\ km^{-1}$) | 1.24 | 1.16 | 1.16 | 1.07 | 1.02 |
| Cable cut-off (nm) | 1300 | 1300 | 1300 | 1300 | 1310 |
| Macrobending (dB/km) | 0.01 | 0.01 | 0.005 | 0.01 | 0.005 |
| Microbending (dB/km)/(g/mm) | 6 | 8 | 7 | 9 | 10 |

As shown in Table 3 and Table 4, different choices of dispersion, dispersion slope and effective area, among others, are possible for the peak-and-ring embodiment. The different choices represents different tradeoffs between attenuation, effective area, dispersion and dispersion slope.

Figure 8:
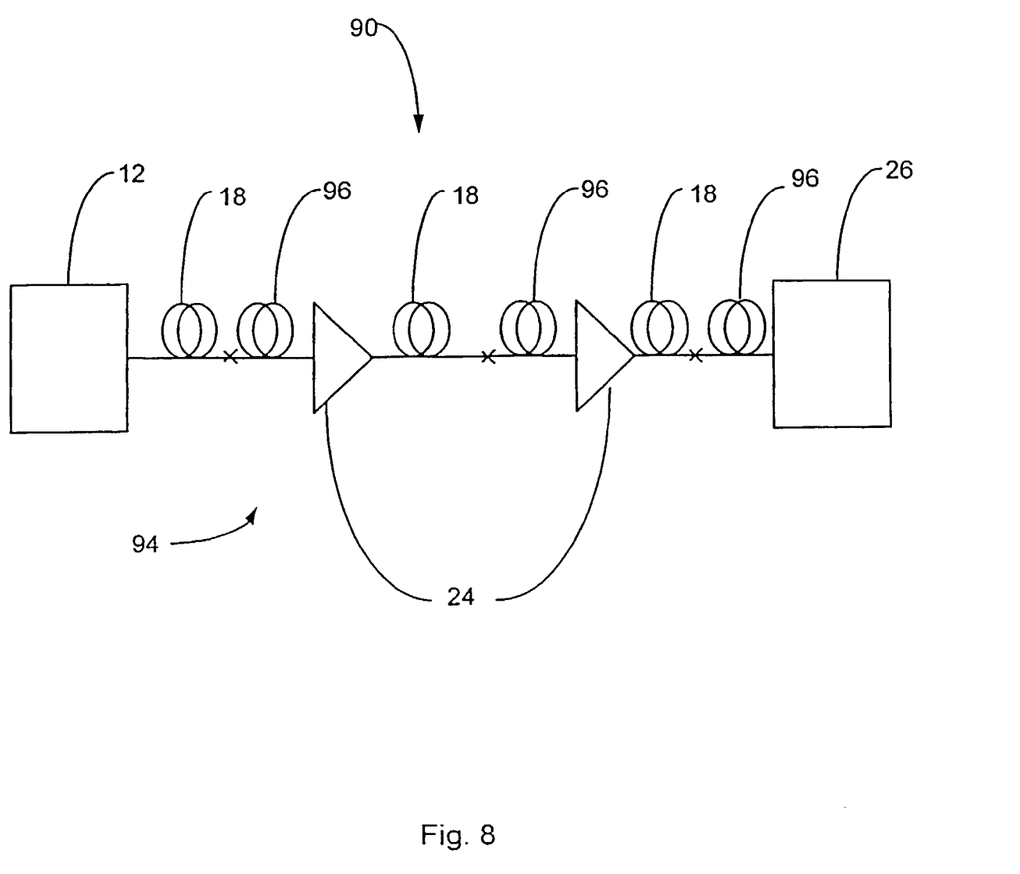
FIG. 8 is a schematic diagram illustrating another embodiment of a transmission system according to the present invention, wherein the transmission line combines spans of half-dispersion-shifted fiber and dispersion compensating fiber.

In accordance with the present invention, another embodiment of a high speed optical communication system is illustrated in FIG. 8 and is generally designated by reference number 90.

As illustrated in FIG. 8, the optical communications system 90 includes a transmitting device 12, a transmission line 94, and a receiving device 26.

Transmitting device 12 adds a signal to transmission line 14. Preferably, an operating wavelength of the transmitting device is at around 1560 nm. However, the WDM channels may have wavelengths in the range 1500–1625 nm, for example.

The present invention contemplates the use of any device or combination of devices readily apparent to one skilled in the art to add the signal to the transmission line. The transmitter 12 could include, for example, a DFB laser modulated directly or externally, e.g. with a Mach-Zehnder interferometer, or a combination of such devices in a WDM configuration. As well, transmitter 12 could comprise wavelength converters for receiving signal wavelengths from a separate transmission network and converting the carrier wavelengths to characteristic wavelengths in a conventional manner.

The optical communication system is capable of supporting any type of communication protocols for the transmitted signals, such as NRZ (non return to zero) or, in alternative, RZ (return to zero), e.g., soliton-like. Furthermore, the system is not limited to a specific bit rate.

In accordance with the present invention, the transmission line 94 includes at least one optical fiber. However, the present invention also contemplates the use of multiple fibers in the same transmission line to increase the signal carrying capacity of the line. The multiple fibers can be bound together in a cable.

In accordance with the present invention, system 90 may include various optical amplifiers 24 positioned between fiber spans of the transmission line 94. The amplifiers 24 may comprise erbium-doped fiber amplifiers for amplifying signals within the 1550 nm transmission window (also called C-band) as well as within the 1585 nm transmission window (also called L-band). As well, system 90 may include an optical add/drop multiplexer (OADM, not shown), for dropping or adding signals to system 90, particularly in a WDM configuration. OADM and amplifiers 24 may be of any type commonly known in the art. Finally, system 90 may include receiver 26 connected directly to optical line 94 or coupled to optical line 94 through other intermediate components. Receiver 26, as readily known in the field, may include a router, demultiplexer, and the like to assist with deciphering the information carried in the optical signals.

As shown in FIG. 8, transmission line 94 includes a first span 18 and second span 96. In the exemplary embodiment, transmission line 14 may also include additional spans. Each span includes at least one single-mode fiber. The present invention also contemplates the use of multiple fibers within each span to increase the signal carrying capacity of the transmission line.

First span 18 includes a Half Dispersion Shifted fiber according to one of the embodiments herein described. While a conventionally used positive dispersion NZD fibers has a typical dispersion at 1560 nm of about 5 ps/nm/km, the HDSF fiber has a higher dispersion than the conventionally used positive dispersion NZD fibers, resulting in a reduced FWM degradation. Moreover, the HDSF fiber has a relatively high dispersion slope value, that allows to achieve a relatively large value of effective area, that is advantageous for reducing all non-linear effects.

Additionally, the attenuation of the HDSF fiber is preferably less than or equal to 0.205 dB/km, that results in a reduced attenuation for the transmission line.

Second span 96 comprises a negative dispersion fiber. The negative dispersion of the second span 96 compensates for the positive dispersion of the first span to bring the cumulative dispersion over the transmission line 94 to approximately zero, e.g., to a value that is sufficiently low, depending on the system characteristics such as signal format, bit rate and wavelength range, to substantially alleviate the problems linked with chromatic dispersion. Thus, the first and second spans are selected with dispersion values and lengths so that the cumulative dispersion reaches about zero at the termination point of receiver 26.

In the optical communication system of the present embodiment, the second span 96 is a dispersion compensating fiber (DCF). There are many known dispersion compensating fibers. The chromatic dispersion of DCF fibers range from about −300 ps/nm/km to about −50 ps/nm/km. A typical value is about −100 ps/nm/Km. Preferably, the chromatic dispersion slope of the fiber is negative to compensate for the positive chromatic dispersion slope of the HDSF 18. The DCF is preferably packaged in a compact module or, alternatively, it may be cabled in a way similar to transmission fibers.

Moreover, a compact module including the DCF fiber may be incorporated in the amplifier 24. In particular, when the amplifier has a dual-stage architecture, the DCF fiber is advantageously coupled between the amplifier stages.

Furthermore, the DCF fibers may be dedicated to a particular wavelength band. For example, in the case of simultaneous C- and L-band transmission, the two bands can be demultiplexed and sent to two different DCFs in parallel configuration. This has the advantage of relaxing the dispersion slope requirement on the HDSF.

According to another embodiment, the second span 96 is a fiber having very-high negative dispersion in the range from −50 to −10 ps/nm/km, for example of about −18 ps/nm/km, either cabled or in compact module configuration. Advantageously, the very-high negative dispersion fiber has a negative dispersion slope.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A single mode optical transmission fiber, the fiber having a core and a cladding, the core comprising:
    an inner core having a first refractive-index difference; and
    a first glass layer surrounding the inner core and having a second refractive-index difference,
    wherein the fiber has a peak refractive index difference value of less than or equal to approximately 0.0140, a zero-dispersion wavelength greater than 1450 nm and lower than 1500 nm, a dispersion value of between about 6 and 11 ps/nm/km at an operating wavelength of about 1560 nm and an effective area of at least 60 $\mu m^2$, and wherein the fiber has a cable cutoff wavelength of less than a value that is approximately 1500 nm,
    and further wherein the first refractive-index difference value is in the range of approximately 0.0100 to 0.0140 and the second refractive-index difference value is in the range of approximately 0.0005 to 0.0030.

2. The fiber of claim 1, wherein the first refractive-index difference is greater than the second refractive-index difference.

3. The fiber of claim 1 further comprising a second glass layer surrounding the first glass layer and having a third refractive-index difference.

4. The fiber of claim 3, wherein the first refractive-index difference is greater than zero, the second refractive-index difference is about zero, and the third refractive-index difference is greater than zero.

5. The fiber of claim 4, wherein the first refractive-index difference value is between approximately 0.0090 and 0.0130 and the third refractive-index difference is between approximately 0.0020 and 0.0080.

6. The fiber of claim 1 wherein the fiber has a dispersion slope value equal to or greater than approximately 0.06 ps/nm$^2$/km.

7. The fiber of claim 1 wherein the effective area is greater than 65 $\mu m^2$.

8. The fiber of claim 1 wherein the fiber has an attenuation value lower than approximately 0.210 dB/km at a wavelength of 1560 nm.

9. An optical transmission line, comprising:
    a first span including at least one single-mode fiber having a negative dispersion at an operating wavelength; and
    a second span coupling to the first span, the second span having at least one single-mode fiber having a positive dispersion at the operating wavelength, the positive dispersion of the second span compensating the negative dispersion of the first span such that the cumulative dispersion across the first and second spans is approximately zero,
    wherein the fiber of the second span is a half-dispersion-shifted fiber having a zero dispersion wavelength greater than 1450 nm and lower than 1500 nm and having a positive dispersion value between approximately 6 ps/nm/km and 11 ps/nm/km at the operating wavelength,
    and further wherein a ratio of the length of the first span to the length of the second span is less than about 6:1.

10. A transmission line according to claim 9, wherein the operating wavelength is approximately 1560 nm.

11. A transmission line according to claim 9, wherein the positive dispersion value of the half-dispersion-shifted fiber of the second span is between approximately 7 ps/nm/km and 10 ps/nm/km at the operating wavelength.

12. A transmission line according to claim 9, wherein an effective area for the half-dispersion-shifted fiber of the second span is greater than 60 $\mu m^2$.

13. A transmission line according to claim 9, wherein the half-dispersion-shifted fiber of the second span has an attenuation value lower than approximately 0.210 dB/km at the operating wavelength.

14. A transmission line according to claim 9, wherein the first span of negative dispersion fiber is a dispersion-compensating-fiber having negative dispersion in the range from −300 to −50 ps/nm/km.

15. A transmission line according to claim 14, wherein the dispersion-compensating-fiber is packaged in a compact module.

16. A transmission line according to claim 9, wherein the first span of negative dispersion fiber is a fiber having high negative dispersion in the range from −10 to −2 ps/nm/km.

17. A high-speed optical communications system having an operating wavelength, comprising:
    a transmission line having first and second spans, each of the first and second spans having at least one single-mode fiber, the fiber of the first span having a negative dispersion value having an absolute value of between approximately 2.5 ps/nm/km and 10 ps/nm/km at the operating wavelength and the fiber of the second span having a positive dispersion at the operating wavelength, the positive dispersion of the second span compensating the negative dispersion of the first span such that the cumulative dispersion across the first and second spans is approximately zero, wherein the length of the first span is greater than the length of the second span;

a transmitting device for adding a signal to the transmission line, the transmitting device being coupled to one end of the transmission line; and a receiving device for receiving the signal sent by the transmitting device, the receiving device being coupled to another end of the transmission line.

18. A method of transmitting a signal over a transmission line having first and second spans of single mode optical fiber, the method comprising the steps of:

adding the signal to the transmission line;

transmitting the signal over the first span of optical fiber having a negative dispersion value having an absolute value of between approximately 2.5 ps/nm/km and 10 ps/nm/km;

compensating for the negative dispersion of the first span by guiding the signal over the second span of optical fiber having a positive dispersion, the total dispersion over the transmission line being compensated to approximately zero, wherein the length of the first span is greater than the length of the second span; and dropping the signal from the transmission line.

* * * * *